United States Patent [19]

Huguenin

[11] 4,248,503
[45] Feb. 3, 1981

[54] ELECTROCHROMIC DISPLAY DEVICE

[75] Inventor: Freddy Huguenin, Lausanne, Switzerland

[73] Assignee: Ebauches S.A., Neuchatel, Switzerland

[21] Appl. No.: 958,004

[22] Filed: Nov. 6, 1978

[30] Foreign Application Priority Data

Nov. 17, 1977 [CH]  Switzerland ........................ 14051/77

[51] Int. Cl.³ ............................................... G02F 1/17
[52] U.S. Cl. ........................................ 350/357; 40/450
[58] Field of Search .......................... 350/357; 40/450; 340/756, 763, 785

[56] References Cited

U.S. PATENT DOCUMENTS

| 4,153,344 | 5/1979 | Hamada et al. ........................ 350/357 |
| 4,160,241 | 7/1979 | Shimizu et al. ........................ 340/763 |

*Primary Examiner*—James W. Davie
*Attorney, Agent, or Firm*—Silverman, Cass & Singer, Ltd.

[57] ABSTRACT

Display elements of an electrochromic display device are formed of two lines of electrochromic material separated by a zone devoid of such material. The areas of the lines of every element are equal to produce equal contrast effects in response to equal activation charges applied thereto.

3 Claims, 2 Drawing Figures

ELECTROCHROMIC DISPLAY DEVICE

BACKGROUND OF THE INVENTION

The present invention relates to an electrochromic display device comprising display elements consisting of electrochromic material.

In an electrochromic display, the contrast effect of the activated segments directly depends, for a given activation charge, on the area of the activated electrochromic material.

Hence, if the display device comprises segments of different lengths but of the same widths, which is most generally the case since it is not desired that the segments constituting or forming the digits have different thicknesses or widths, the area of these segments will not be the same or equal.

Consequently, if a display device comprises segments of different lengths, but of the same widths, it is necessary to apply to these segments different activation charges in order that they all exhibit the same contrast effect. Obviously, this complicates the electronic control circuit of the device.

The object of the present invention is to provide an electrochromic display device in which the appearance of the display elements (segments) is substantially the same when equal activation charges are applied thereto, even when the lengths of the elements are different and their widths are the same.

SUMMARY OF THE INVENTION

To this end, the device according to the invention includes that each element in at least one group of elements, consists of two lines of electrochromic material separated by a zone which is devoid of said material, the width of said zone being a function of the length of the element, so that the area of the electrochromic material of each of the elements of said group is the same for the whole group of elements.

BRIEF DESCRIPTION OF THE DRAWINGS

The drawing shows, by way of example, two embodiments of the invention.

DESCRIPTION OF THE PREFERRED EMBODIMENT

Figure 1:
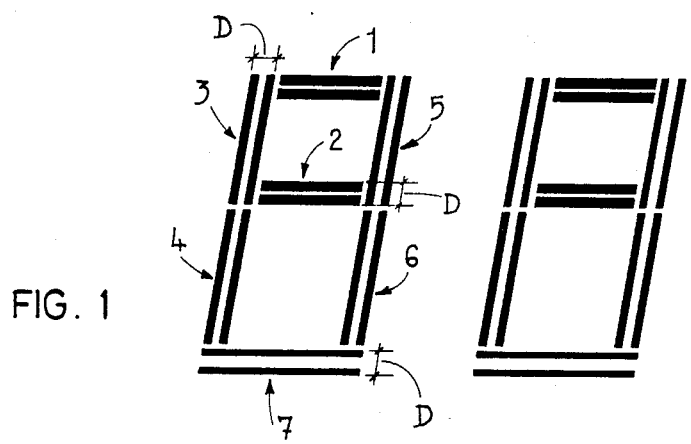
FIGS. 1 and 2 are views of a first and of a second embodiment, respectively, of a display device having two digits each consisting of seven segments made of electrochromic material.

Each digit of the display device of FIG. 1 comprises two short segments 1 and 2, of the same length, four middle segments 3, 4, 5 and 6, of the same length, and a long segment 7. All of these segments are formed by two parallel lines of electrochromic material arranged in such a way that the distance D between the outer edges of said lines is the same for the three types of segments, but the widths of each segment is inversely proportional to its length. In other words, the distance between their inner edges of these lines or the widths of the free space which separates these lines increases with the length of these lines. The arrangement is such that the areas occupied by the lines of electrochromic material of each of the segments of each digit are the same for the whole digit. Hence, the contrast effects (coloration) exhibited by these segments will be the same for all of them, even though these segments have different lengths and even if they all receive an equal charge of activation.

Figure 2:
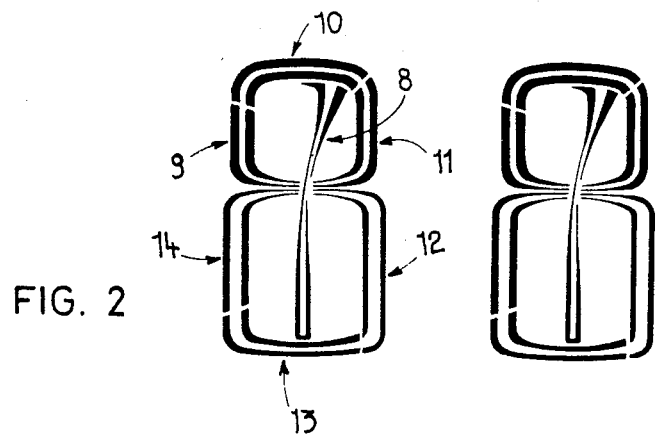

In the embodiment of FIG. 2, the display elements (segments) of each digit, designated by the reference characters 8 to 14, all have a different shape, but all consist of two lines of electrochromic material separated by an intermediary zone devoid of said material. The arrangement of this embodiment is such that the area of the electrochromic material is the same for each of the display elements. Hence, as was previously explained, the appearance of the display elements activated by an equal charge is the same for all of said elements.

The general appearance of the display elements of the digits of FIG. 2 being unusual, it may be interesting to specify here how the ten digits 0 to 9 are displayed:

The "0" by means of elements 12, 13, and 14; the "1" means of element 8; the "2" by means of elements 10, 11, 14 and 13; the "3" by means of elements 10, 11, 12 and 13; the "4" by means of elements 9, 11 and 12; the "5" means of elements 10, 9, 12 and 13; the "6" by means of elements 10, 9, 12, 13 and 14; the "7" by means of elements 8 and 10; the "8" means of elements 9, 10, 11, 12, 13 and 14; and the "9" by means of elements 9, 10, 11, 12 and 13.

In the two examples as represented, all of the display elements of each digit have the same or equal areas of electrochromic material. However, it would be possible to contemplate the case where the display elements would constitute groups in each of which the area of the electrochromic material would be the same but where this area could vary from group to the other one. In this case, unequal activation charges should be applied to each group in order that the appearance of the whole of the display elements be the same.

What I claim is:

1. In an electrochromic display device having display elements wherein the improvement comprises each element being formed by two lines of electrochromic material separated by a zone which is devoid of said material, the area of the electrochromic material being the same for all the elements.

2. The electrochromic display device as claimed in claim 1 wherein the width of the lines of each of the elements is constant and inversely proportional to their length.

3. The electrochromic display device as claimed in claim 2 wherein the two lines of each of the elements are parallel and the distance separating the outer longitudinal edges of said lines is the same for all the elements.

* * * * *